United States Patent
Mason

(10) Patent No.: US 6,744,487 B2
(45) Date of Patent: Jun. 1, 2004

(54) PRODUCING A SOUNDTRACK FOR MOVING PICTURE SEQUENCES

(75) Inventor: Andrew James Mason, Reigate (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 10/022,060

(22) Filed: Dec. 13, 2001

(65) Prior Publication Data

US 2002/0089645 A1 Jul. 11, 2002

(30) Foreign Application Priority Data

Jan. 4, 2001 (GB) ............................................. 0100165

(51) Int. Cl.$^7$ .............................. G03B 31/00; H04R 5/00
(52) U.S. Cl. ................................. 352/1; 352/5; 381/17; 463/35
(58) Field of Search ....................... 352/1, 5, 6; 381/17; 463/35

(56) References Cited

U.S. PATENT DOCUMENTS

| 5,636,283 A | | 6/1997 | Hill et al. |
| 5,754,660 A | * | 5/1998 | Shimizu ...................... 381/17 |
| 5,768,393 A | * | 6/1998 | Mukojima et al. ............ 381/17 |
| 5,798,922 A | * | 8/1998 | Wood et al. .................. 700/94 |
| 5,812,674 A | | 9/1998 | Jot et al. |
| 5,993,318 A | * | 11/1999 | Kousaki ...................... 463/35 |
| 6,078,669 A | | 6/2000 | Maher |
| 6,167,138 A | | 12/2000 | Shennib |

FOREIGN PATENT DOCUMENTS

| EP | 0 593 228 A1 | 4/1994 |
| EP | 0 674 315 A1 | 9/1995 |
| GB | 2 277 239 A | 10/1994 |

OTHER PUBLICATIONS

EP Application No. 01310882 Search Report dated Aug. 25, 2003.

* cited by examiner

Primary Examiner—Russell Adams
Assistant Examiner—D. Ben Esplin
(74) Attorney, Agent, or Firm—Flynn, Thiel, Boutell & Tanis, P.C.

(57) ABSTRACT

Apparatus for dubbing a film from a source language to a target language includes a replay device (1) which replays a film and a control unit (6) which generates an acoustic model of the scene. A dubbing soundtrack on the replay device (1) is fed via a line (2) to an acoustic processor (3). The acoustic processor (3) processes the dubbed soundtrack under the control of the control unit (6) to produce a dubbed soundtrack which is modified to take into account the acoustic environment of the scene. This soundtrack may be recorded on a recording device (5).

The application further discloses the generation of soundtracks for computer generated scenes taking into account the virtual acoustic environment.

33 Claims, 3 Drawing Sheets

PRODUCING A SOUNDTRACK FOR MOVING PICTURE SEQUENCES

FIELD OF THE INVENTION

The invention relates to a method of producing a soundtrack to accompany a moving picture sequence and to a method of dubbing the dialogue of one or more participants in a moving picture sequence, into a target language different from the source language. The invention further relates to an apparatus for producing a soundtrack to accompany a moving picture sequence and to an apparatus for dubbing the dialogue of one or more participants in a moving picture sequence into a target language different from the source language.

BACKGROUND OF THE INVENTION

It is common practice for films and other television programmes to be dubbed in the language of the country in which they are to be shown, either in the cinema or on television. There is frequently a mismatch between the acoustics that would be present in the environment represented by the pictures and the acoustics of the environment in which the dubbed dialogue is recorded. For example, the dubbed dialogue is normally recorded in a studio environment by actors who are not moving about, whereas the original film or television programme may have been generated on specially constructed sets or in the open air. Additionally the actors, or participants, are frequently moving around the scene whilst the original dialogue is being produced. A similar problem may arise when films are produced with the intention of dubbing them. The sound effects then have to be recreated subsequently, without the contemporaneous dialogue, and so do not match the acoustics in which the action took place. A simple way of improving the situation is to apply artificial reverberation to the microphone signal obtained from the dubbing actor, or to the sound effects in the dubbing studio, to match the reverberation that would be created by the environment in the picture. Experience of dubbed films shows that this is not always adequate. A further possibility is to perform dubbing using the original actors in the film. This, however, is tantamount to recreating films in different languages and the cost is likely to be prohibitive.

SUMMARY OF THE INVENTION

The invention provides a method of producing a soundtrack to accompany a moving picture sequence, the soundtrack including dialogue intended to appear to be produced by a participant in the moving picture sequence, the method comprising the steps of:

a) producing, in a first acoustic environment different from that of the scene in the moving picture sequence, an electrical signal representing dialogue intended to appear to be produced by the participant, b) constructing a model of the acoustic environment of each scene in the moving picture sequence in synchronism with the moving picture sequence, c) specifying the position of the participant in the current scene, and d) modifying the electrical signal in accordance with the acoustic environment of the scene and the position of the participant in the scene so as to simulate the dialogue which would have been produced had the dialogue been produced by the participant at the current position of the participant in the scene.

One application of this method is in the generation of computer animations when creating or playing games. For example, using this method a games player can insert dialogue into the mouth of a character in a computer game for replay either to that player or to another player either at the same location or at a remote location.

When the moving picture sequence soundtrack contains dialogue in a first (source) language the method may be arranged to generate dialogue, for inclusion in the soundtrack, in a second (target) language equivalent to the dialogue in the first language.

This enables dubbing of a film or other sequence into a different language while retaining the appearance of the soundtrack issuing from the participant in the scene without having to recreate the scene when producing the second language version. The target language may replace or be in addition to the source language in a dual language version of the sequence.

The method may advantageously allow dubbing of the dialogue of two or more participants, or actors, taking into account the position of each in the scene.

Step b) and Step c) may be performed using a user interface to a computer, said user interface in combination with said computer enabling a user to construct an acoustic model of the scene and to define time varying positions of the participant within the scene.

Thus a simple to use control interface may be provided which allows the operator to construct a simple model of the environment seen in the moving picture sequence and mimic the movement of the actors or other participants in a scene in order to produce a new soundtrack in which the dialogue is processed to sound as it would if it had been produced in the environment of the scene.

The method according to the invention may advantageously enable a virtual environment corresponding to that which existed when the film, or other moving picture sequence, was generated, to be created and for the characteristics of that environment to be applied to the speech of the dubbing actors, to modify it so that it appears to have the characteristics that would have been created, had the dubbing actor taken part in the original scene. This allows the power of a computer to generate a virtual environment and produce control signals for an acoustic processor, which is able to modify the signal produced by the dubbing actor to take into account the acoustics of the scenes in the film.

It should be noted that when the term 'film' is used in this application, it is intended to cover more than purely cinematographic films. That is, it is intended to cover directly generated video programmes which may be films, documentary programmes, discussion programmes, current affairs, news programmes or any other sequence of moving pictures, however generated, and whenever the term film is used it should be given that interpretation.

The invention further provides an apparatus for producing a soundtrack to accompany a moving picture sequence, the soundtrack including dialogue intended to appear to be produced by a participant in a moving picture sequence the apparatus comprising an input for receiving an electrical signal, produced in a first acoustic environment different from that of the scene in the moving picture sequence, representing dialogue intended to appear to be produced by the participant, an acoustic model generator for generating a model of the acoustic environment of each scene in the moving picture sequence in synchronism with the moving picture sequence and the position of the participant in the current scene, and a processor for processing the electrical signal in accordance with the acoustic environment of the scene and the position of the participant in the scene so as to simulate the dialogue which would have been produced by the participant at the current position of the participant in the scene, and producing the processed signal at an output.

The invention still further provides an apparatus for dubbing the dialogue of a participant in a moving picture sequence into a target language different from a source language, comprising an input for receiving an electrical signal, produced in a first acoustic environment, and representing dialogue in the target language corresponding to the dialogue in the source language, an acoustic model generator for generating a model of the acoustic environment of each scene in the moving picture sequence in synchronism with the moving picture sequence, and the position of the participant in the current scene, and a processor for processing the electrical signal in accordance with the acoustic environment of the scene and the position of the participant in the scene so as to simulate the dialogue which would have been produced had the dubbing been performed in the scene and in the position of the participant, and producing the processed signal at an output.

The invention yet further provides a record medium having recorded thereon a soundtrack produced by a method according to the invention.

The invention enables recording media, such as magnetic tape or optical discs, to be produced with a soundtrack in a plurality of languages one of which may be selected by the viewer when the moving picture sequence is replayed. By using the method according to the invention to create the soundtrack containing secondary languages in addition to the primary (original) language of the sequence, a greater realism in viewing the sequence using a secondary language may be obtained. In continents such as Europe where many different languages are spoken there is great advantage to suppliers of recorded films in producing a single recording having a plurality of different languages in the soundtrack, one of which may be selected by the viewer at the time of replay of the film. This largely relates to the minimisation of the number of different versions which need to be produced and distributed.

The invention still further provides a computer program that, when loaded on a computer, enables the playing of a computer game, the program including a description of the acoustic environment of at least some of the scenes in the game, and a computer program that, when loaded on a computer, enables the computer to carry out a method according to the invention.

BRIEF DESCRIPTION OF THE DRAWINGS

The above and other features and advantages of the invention will be apparent from the following description, by way of example of an embodiment of the invention with reference to the accompanying drawings, in which.

DETAILED DESCRIPTION

Figure 1:
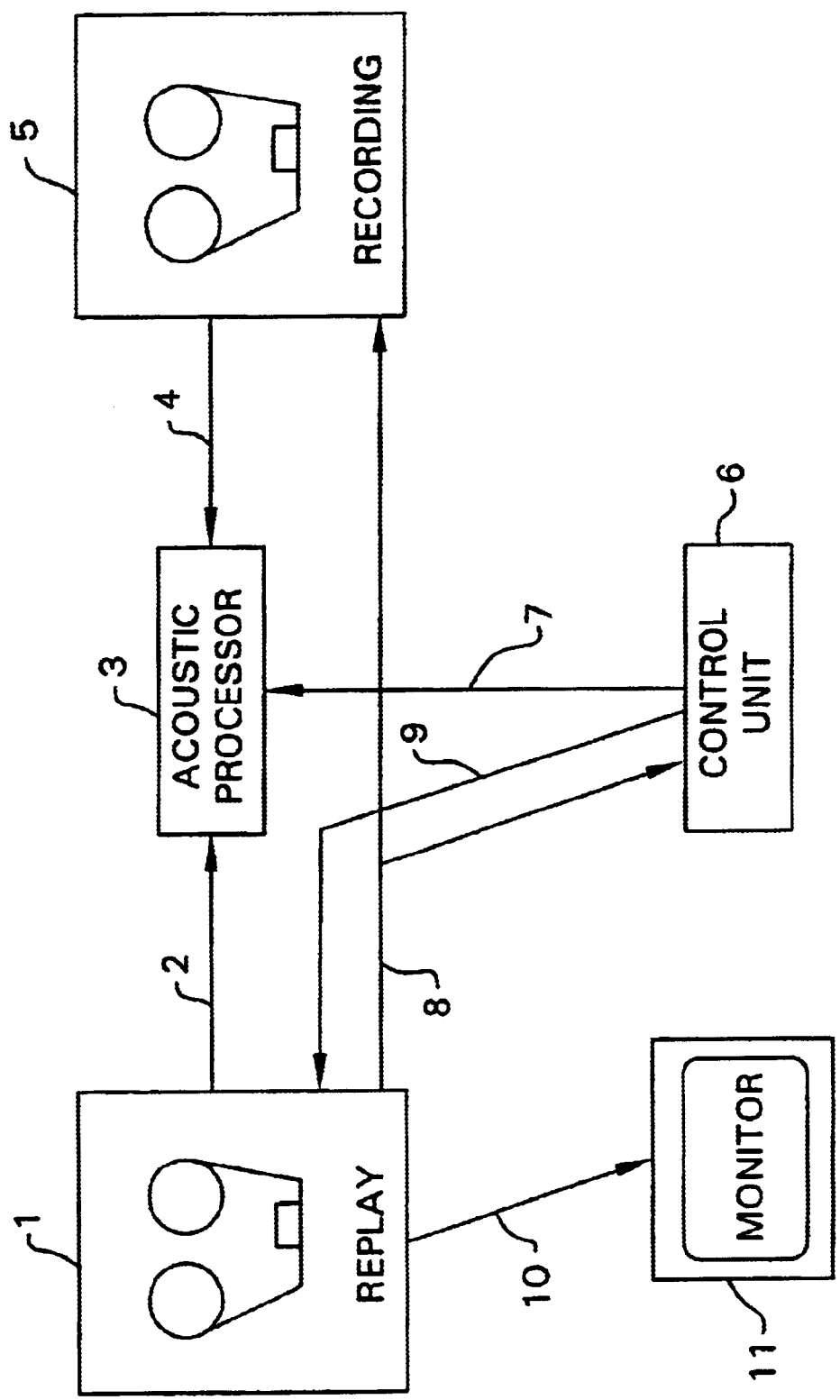
FIG. 1 shows in block schematic form an apparatus for dubbing the dialogue of one or more participants in a moving picture sequence according to the invention.
Figure 2:
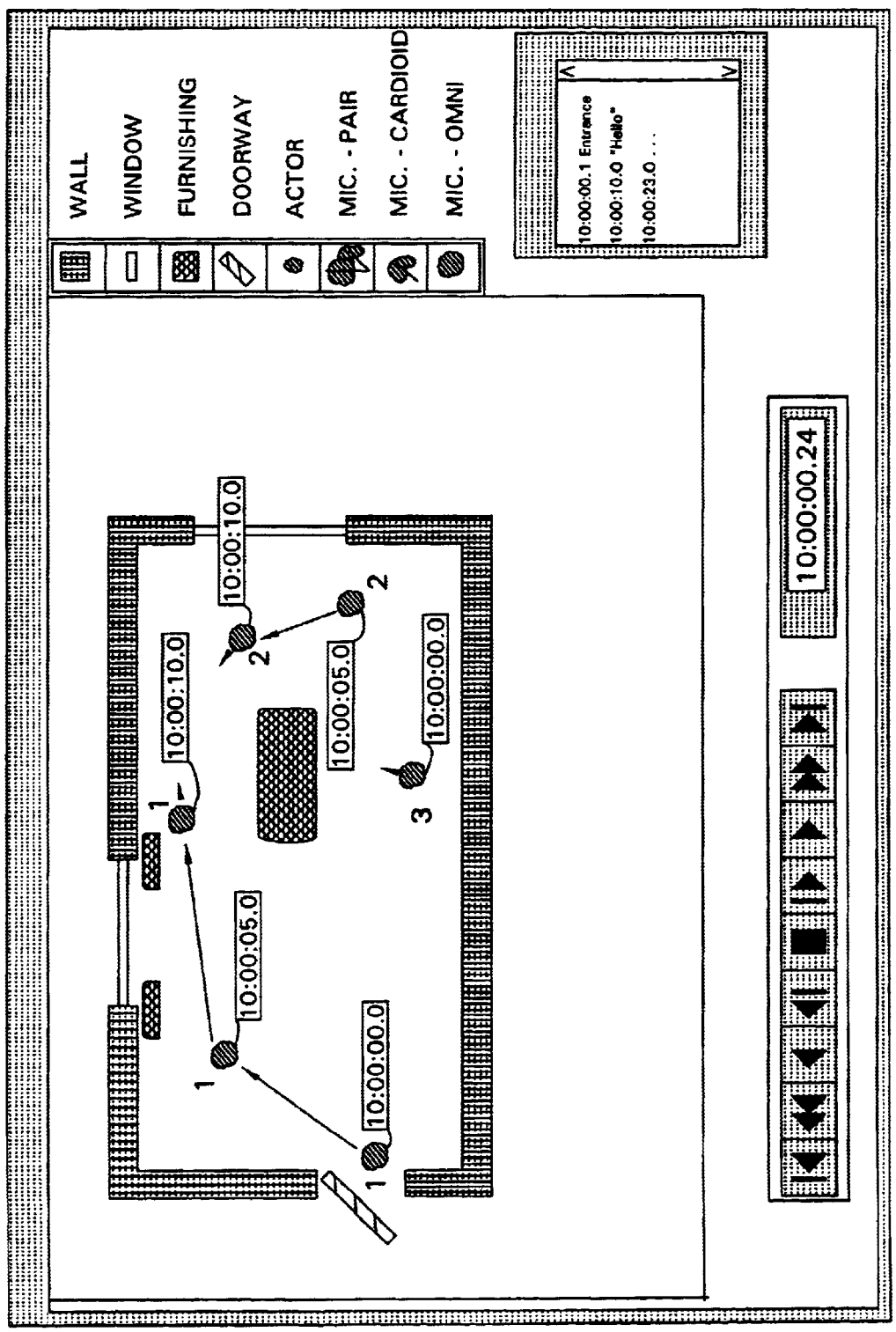
FIG. 2 illustrates the user interface used in the apparatus of FIG. 1.

As shown in FIG. 1 the apparatus comprises a replay device 1 for replaying the original pictures and the dubbed dialogue before acoustic processing. The audio output from the replay device 1 is fed via a path 2 to a first input of an acoustic processor 3. The replay device 1 is typically a video tape recorder but could take any convenient form, for example, a video disc player. The output of the acoustic processor 3 is fed via a path 4 to a recording device 5. Again, the recording device 5 may typically be a video tape recorder but could equally be a disc recorder or any other mass storage device. A control unit 6, which includes a user interface which may be as described hereinafter with reference to FIG. 2, is used to create an acoustic model of the scene in the picture sequence and has an output which is fed via a path 7 to a control input of the acoustic processor 3. The control unit 6 receives an output from the replay device 1 over a path 8 which provides time code information to enable synchronisation with the scene being reproduced by the replay device 1. This time code information is also fed over the path 8 to the recording device 5. The control unit 6 has a further output which is fed via a path 9 to the replay device 1 which in the case of a video tape recorder, will perform a tape transport control function. The replay device 1 has a further output which is fed over a path 10 to a monitor 11 so that the operator can view the scene being replayed by the device 1.

The function of the control unit 6 is to allow the construction of a model of the fixed parts of the environment shown in the pictures in the film and the presence and motion of the actors, or more generally, sound sources, in the environment.

While the task of modelling exactly what effect an acoustic environment has on the propagation of sound within it is enormously complex and in the limit one would have to take into account every reflection, diffraction and absorption of the sound by every surface of every object in the environment from its generation until its reverberation into imperceptibility. This task can, however, be simplified by modelling only the first reflection of sound by the surfaces and then modelling the reverberation of the sound in a generic way, based on the assumption that there is a sufficiently high density of acoustic modes and reflections, rather than calculating the effects of all the subsequent reflections. Whilst this obviously falls short of being totally accurate, for the purposes of film dubbing it produces acceptable results.

In practice a simple model of an acoustic environment can be constructed by combining three main effects: first, the sound that travels directly from the sound source to receiver (ear to microphone); secondly, the sound that reaches the receiver after being reflected once by surfaces in the environment; and, thirdly, the general reverberation of the sounds within the environment that reaches the receiver.

Clearly, the first two effects usually take place in a relatively short time, while the third takes place over a significantly longer time. In a typical interior room of a house, the distance from source to receiver will be of the order of 2m, and the room dimensions of the order of 4m, consequently, the direct sound will reach the receiver after about 6ms, the first reflections after some 10ms or 20ms, but the reverberation time could be as much as 200ms.

The first effect of the model (the direct sound) uses time-of-flight, that is the time taken for the sound to reach the receiver from the source, the directivity of the source, and air absorption. To do this, the model uses information describing the position and orientation of the source and the position and orientation of the receiver.

The second effect is similar but the absorption of the surfaces involved has to be taken into account. Consequently, the model uses information about the wall, floor, ceiling and any large objects in the environment. The position, shape, orientation and absorption of the surfaces are used.

The modelling of the reverberation may be achieved by using one of the well known techniques such as feedback delay networks (FDN) or digital waveguide network (DWN). The overall acoustic properties of the space are taken into account, rather than trying to implement an explicit model. The model uses information about the size of the environment, the absorption of its boundary surfaces and any significant objects in the environment.

Figure 3:
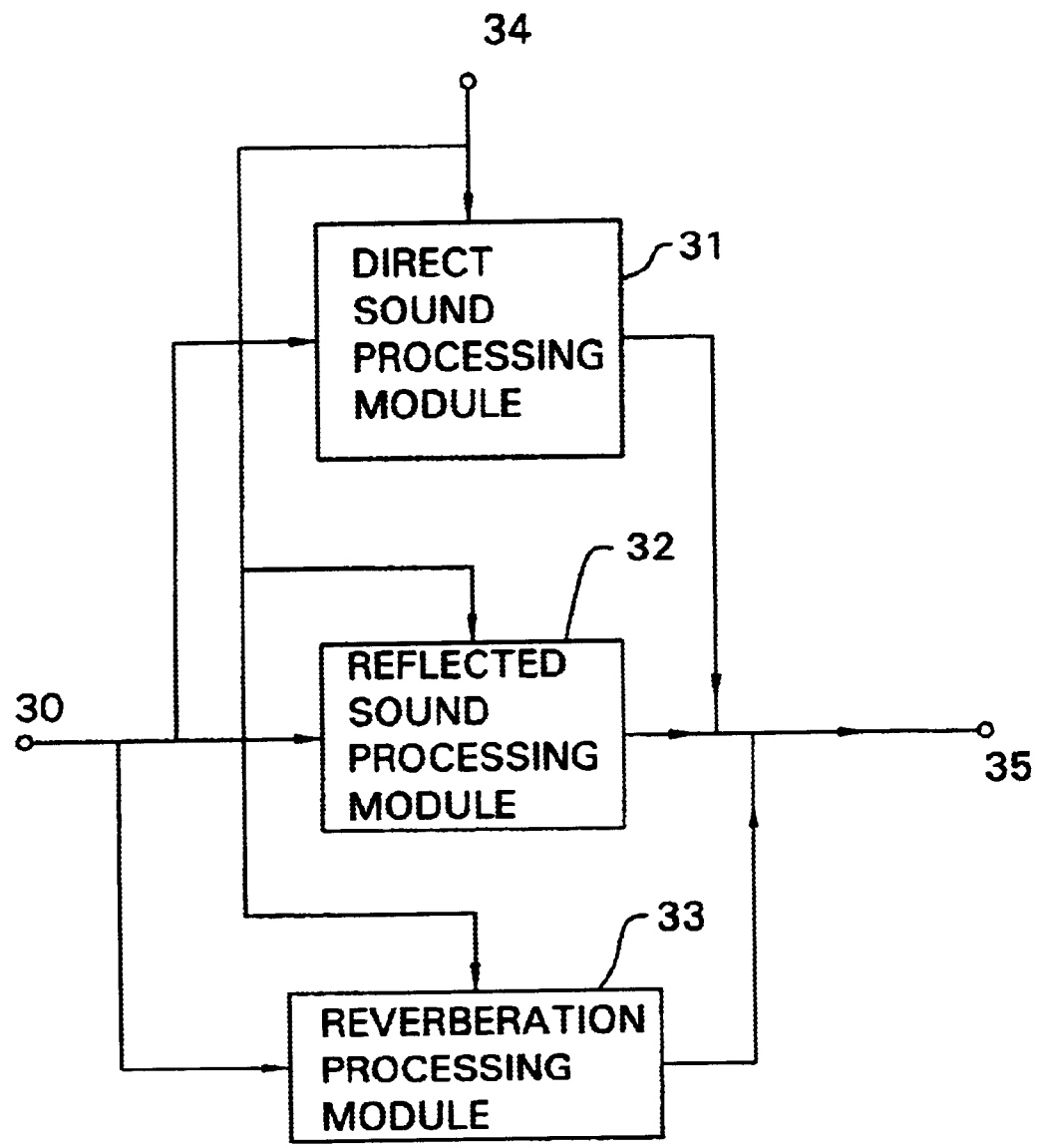
FIG. 3 shows in block schematic form an acoustic processor for use in the apparatus of FIG. 1.

FIG. 3 shows in block schematic form one embodiment of an acoustic processor which may be used as the acoustic processor 3 shown in FIG. 1. As shown in FIG. 3, the acoustic processor has an input 30 to which the acoustic signal produced by the replay device 1 is passed over the path 2. The input 30 is connected to signal inputs of three processing modules 31, 32 and 33. A control input 34 receives control signals from the control unit 6 over path 7 and is connected to control inputs of the three processing modules 31, 32 and 33. An output 35 of the processor provides a processed acoustic signal for transmission to the recording device 5 over path 4 and is the combination of the outputs of the processing modules 31, 32 and 33.

The processing module 31 processes the direct sounds and receives an input from the control unit 6 which causes it to process the input signal such that it produces at its output a signal representing the acoustic signal that would have resulted if the source of the input signal was placed in the position and orientation of the source in the scene and the receiver of the input signal was positioned where the microphone was placed in the scene. That is the distance between the source and receiver is represented in the control signal as well as any acoustically absorbing material between the source and receiver.

The modelling of the direct sound is principally affected by the position of the source and receiver, unless an object, sufficiently large to affect the propagation of the sound, is interposed between the two. A description (size, position and absorption coefficient) of surfaces of objects in the environment which will substantially affect the direct sound propagation is therefore generated. This information is then used by the direct sound processing module 31. The processing applies time delays and frequency dependent filtering to model the time-of-flight of the sound and the frequency selective absorption by air. The directivity of the source, assumed to be a human speaking; is modelled by a filter with band-pass characteristics governed by the direction in which the actor is facing.

The processing module 32 processes the reflected sounds and receives an input from the control unit 6 which causes it to add reflected sounds to the input signal in dependence on reflecting surfaces as defined by the signal from the control unit 6.

The control unit 6 generates a description (size, position and absorption coefficient) of the six boundary surfaces (typically 4 walls, floor, ceiling) enclosing the space so that the nature of the reflection of a sound by the surface can be calculated. These descriptions are then used by the early reflections processing module 32 in a simple geometric way taking into account the frequency-selective absorption of air and of the boundary surfaces.

The control unit 6 further generates a description (size, position and absorption coefficient) of surfaces of objects in the room which will give significant reflections of the sound sources. A simple threshold may be applied such that if the size of the object is sufficiently small in relation to the other objects in the environment, or the environment itself, the effect of the object can be ignored. These descriptions are then used by the early reflections processing module 32, if significant, in the same way as the boundary surfaces.

Thus, the processing module 32 will contain delay and filtering arrangements to produce replicas of the input signal which are combined to produce a signal representative of the effect of reflections which would have occurred if the sounds had been produced in the scene. The number of delay and filtering arrangements provided will depend on the maximum number of reflections it is desired to take into account and will be a compromise between reasonable cost and maximum performance.

Clearly, if multiple reflections are to be taken into account, or those produced by small objects, a greater quantity of delay and filtering apparatus will be required.

The processing module 33 takes into account the reverberation of the scene and receives an input from the control unit 6 which controls the manner in which it processes the input signal to mimic the reverberation of the scene.

The control unit 6 calculates the reverberation parameters of the space, based on the size and absorption coefficients of the surfaces enclosing the space and input these to the reverberation processing module 33.

Thus, the reverberation processing module will again contain delay and filtering apparatus to add a decaying signal to the input signal to produce at its output a signal mimicking the reverberation of the scene.

During operation, the control unit 6 continuously updates the dynamic properties of the scene to cause the characteristics of the processing modules 31 to 33 to adapt to the changes in the scene.

The control unit 6 is typically a personal computer. FIG. 2 shows an example of a user interface which may be implemented on such a personal computer.

In carrying out one embodiment of the method according to the invention, the user first constructs a model of the environment using estimates of dimensions taken from the screen. The model of the environment may be kept simple. In the example shown in FIG. 2, the fixed elements are four walls, two windows, an open doorway, some soft furnishings at one of the windows, that is curtains, and a large soft furnishing just right off centre, for example a sofa. This model would be constructed by drag and drop from the tool pallet shown on the right of FIG. 2. Each of the objects has a number of adjustable parameters, for example size and acoustic absorption. The acoustic absorption of the wall surfaces would be defined from a list of different surface types, for example tiles, wallpaper, and fabric covering. Similarly, furnishings may be described as wood, leather, fabric etc. All objects would be defined in terms of their height, width and depth. One or more microphones are then positioned in the model where the microphones used for the original generation of the film would have been placed in the actual scene. The microphones could be a crossed pair, in which case the audio processing would produce a two channel output. Other microphone arrangements could be catered for, such as a single microphone, in which case a mono output would be produced, or an arbitrary number of mono microphones arbitrarily positioned could be included.

The actors are positioned in the model, each actor corresponding to one audio signal. Actors are assumed to occupy one position at a given time and another position at a later time. For example, as shown in FIG. 2, actor one appears at the doorway at time 10:00:00:0 and then moves towards the window 10:00:05:0 and finishes to the right of the window at 10:00:10:0. The tape transport controls can be used to check that the motion shown on the model corresponds to the motion in the picture, either frame by frame, or at normal speed. The times at which the actor occupies a given position may be determined from the time code read from the replay machine. The actor is placed on the model at the position at which they first appear on the screen and then subsequent positions are indicated by dragging and dropping the marker at other places on the screen. The user can play the tape until the actor is seen to reach a particular position and then the user interface can be used to put a marker on the screen in the desired place noting the current time code. Thus, as can be seen from FIG. 2, each position of each actor is associated with a corresponding time. The position may be defined to include the orientation of the actor and in particular the orientation of his/her mouth.

In addition, cues can be used to mark scene changes where the fixed environment changes or any other useful reference points. This procedure is followed by the user until the whole of the moving picture sequence has been modelled scene by scene, thus the user continuously monitors the scene on the monitor 11 to construct the acoustic model using the user interface on the control unit 6.

Once the model is complete, the user replays the film using the replay device 1 from the start with the recording device 5 running and the audio is processed according to the time varying information sent from the control unit 6 to the acoustic processor 3. By this means recordings having a target language dubbed into the soundtrack may be produced and the invention extends to the provision of a record carrier, for example a magnetic tape or an optical disc, having such a soundtrack recorded thereon. A particular advantage of such a recording is that it may carry a soundtrack in a plurality of languages, including the original source language and one or more target languages each of which have greater reality from being produced by a method according to the invention.

As has been described earlier, the control unit 6 may be implemented as a personal computer, and the video audio replay device 1 and recording device 5 nay be part of the personal computer, or could be external conventional tape machines, controlled by a standard RS422 remote control protocol. The acoustic processor may be constructed from digital signal processing hardware, typically a number of digital signal processors. The actual number will be determined by the complexity of the model, the number of signal sources and the number of signal destinations. Control of the acoustic processing could use a standard network protocol to enable remote control of the acoustic processor.

Whilst the embodiment described above relates to the application of the invention to the dubbing of films from one language into another it will be clear that the invention is by no means limited to such an application. The invention is equally applicable to the generation of dialogue for computer games or cartoon type films where there is no original soundtrack and the scene itself may not be physically realised and may exist purely as a drawing or a computer generated model. The soundtrack for a cartoon type film may be produced in a studio environment and then processed by a method according to the invention to enable the voices of the cartoon characters to appear to be produced from the positions of the characters in the scene. A similar process may be carried out for computer games where a player can speak into a microphone attached to a computer that includes an acoustic processor. The computer game will include a description of the scene and track the movement of the characters. In order to carry out the invention the computer game includes a description of the acoustic environment of each scene and consequently can control the acoustic processor to process the dialogue spoken by the player to cause it to appear to come from a character in the game and to emanate from the position of the character in the scene. The processed signal may be played back to the player either through headphones or loudspeakers or to another player either at the same location or at a remote location.

What is claimed is:

1. A method of producing a soundtrack to accompany a moving picture sequence, the soundtrack including dialogue intended to appear to be produced by a participant in the moving picture sequence, the method comprising the steps of:

a) producing, in a first acoustic environment different from that of a scene in the moving picture sequence, an electrical signal representing dialogue intended to appear to be produced by the participant;

b) constructing a model of the acoustic environment of the scene in the moving picture sequence in synchronism with the moving picture sequence, the model of the acoustic environment including the location of objects in the scene that reflect sound or that cause sound to reverberate and the acoustic absorption characteristics of the objects;

c) specifying the position of the participant in the scene; and d) modifying the electrical signal so as to simulate the dialogue which would have been produced had the dialogue been produced by the participant and heard based on the position of the participant in the scene and the model of the acoustic environment of the scene.

2. The method as claimed in claim 1, wherein the moving picture sequence soundtrack contains dialogue in a first language and the method is arranged to generate dialogue, for inclusion in the soundtrack, in a second language equivalent to the dialogue in the first language.

3. The method as claimed in claim 1, in which said step of constructing the model of the acoustic environment of the scene is performed using a user interface to a computer, said user interface, in combination with said computer, enabling a user to construct the model of the acoustic environment scene and to define positions of the participant in the scene that shift with time during the motion picture sequence.

4. The method as claimed in claim 1, in which the position of the participant is specified together with an associated time relative to the beginning of the motion picture sequence.

5. The method as claimed in claim 2, in which the position of the participant is specified together with an associated time relative to the beginning of the motion picture sequence.

6. The method as claimed in claim 4, wherein:

for the motion picture sequence, the positions of the participant in the scene are specified with an associated time relative to the beginning of the motion picture sequence for a plurality of chronologically spaced apart times during the motion picture sequence; and for times between which the positions of the participant are specified in scene are specified, said step of specifying the position of the participant in the scene is performed by calculating intermediate positions in the scene of the participant based on the positions of participant for which time-specific positions in the scene are specified.

7. The method as claimed in claim 5, wherein:

for the motion picture sequence, the positions of the participant in the scene are specified with an associated time relative to the beginning of the motion picture sequence for a plurality of chronologically spaced apart times during the motion picture sequence; and for times between which the positions of the participant are specified in scene are specified, said step of specifying the position of the participant in the scene is performed by calculating intermediate positions in the scene of the participant based on the positions of participant for which time-specific positions in the scene are specified.

8. The method as claimed in claim 1, in which:
the electrical signal produced in the first acoustic environment is recorded on a recording medium; and the recorded electrical signal is the signal that is subject to said step of being modified.

9. The method as claimed in claim 8, in which a computer is arranged to control the operation of a replay device for replaying the recorded electrical signal to enable said step of modifying the recorded electrical signal to be executed.

10. The method as claimed in claim 1, including the further step of:
specifying a microphone position relative to the scene and;
wherein said step of modifying the electrical signal is further performed based on the position of the microphone relative to the scene.

11. The method as claimed in claim 2, including the further step of:
specifying microphone position relative to the scene and;
wherein said step of modifying the electrical signal is further performed based on the position of the microphone relative to the scene.

12. An apparatus for producing a soundtrack to accompany a moving picture sequence, the soundtrack including dialogue intended to appear to be produced by a participant in a moving picture sequence, the apparatus comprising:
an input for receiving an electrical signal produced in a first acoustic environment different from that of the scene in the moving picture sequence representing dialogue intended to appear to be produced by the participant;
an acoustic model generator for generating a model of the acoustic environment of the scene in the moving picture sequence, the acoustic model including the location of elements in the scene that reflect sound or that cause sound to reverberate and the acoustic absorption characteristics of the elements; and
a processor for receiving the electrical signal and an indication of the location of the participant in the scene for processing the electrical signal in accordance with the model of the acoustic environment of the scene and the position of the participant in the scene so as to simulate the dialogue which would have been produced by the participant at the current position of the participant in the scene, and producing a processed signal at an output.

13. The apparatus as claimed in claim 12, wherein said input comprises a replay device for replaying an electrical signal recorded on a recording medium.

14. The apparatus as claimed in claim 12 wherein said acoustic model generator comprises a computer having a graphical user interface by means of which a user can create and display a simulation of the scene by selecting and displaying predefined elements having predefined assignable acoustic characteristics, the computer being programmed to determine the acoustic environment of the scene by reference to the acoustic characteristics and the positions of the elements of the scene.

15. The apparatus as claimed in claim 14, wherein:
said graphical user interface enables the position in the scene of the participant whose dialogue is being output to be entered for a plurality of chronologically spaced apart times during the motion picture sequence; and
said processor receives from said graphical user interface an indication of the positions of the participant during the motion picture sequence and simulates the dialogue which would have been produced by the participant based on the positions wherein, for times between which the positions of the participant are specified, said processor calculates intermediate positions in the scene for the participant based on the positions of the participant for which time-specific positions in the scene are entered.

16. The apparatus as claimed in claim 14, wherein:
said graphical user interface enables the position of a simulated microphone in the scene to be entered; and
said processor receives from said graphical user interface an indication of the position of the microphone in the scene and processes the electrical signal based on the model of the acoustic environment of the scene, the position of the participant in the scene and the position of the microphone in the scene.

17. The apparatus as claimed in claim 15, wherein:
said graphical user interface enables the position of a simulated microphone in the scene to be entered; and
said processor receives from said graphical user interface an indication of the position of the microphone in the scene and processes the electrical signal based on the model of the acoustic environment of the scene, the position of the participant in the scene and the position of the microphone in the scene.

18. The apparatus as claimed in claim 12, wherein said processor comprises an acoustic processor having a first input for receiving said electrical signal, a control input for receiving a signal representing the acoustic characteristics of the scene produced by said acoustic model generator, and an output from which the processed signal is derived, wherein the acoustic processor is constructed and arranged to process the electrical signal so as to produce the output signal as a function of the signal from the control input.

19. The apparatus as claimed in claim 12, further including a recording medium upon which the processed signal from said processor is recorded.

20. An apparatus for dubbing the dialogue of a participant in a moving picture sequence into a target language different from a source language, comprising:
an input for receiving an electrical signal produced in a first acoustic environment and representing dialogue in the target language corresponding to the dialogue in the source language;
an acoustic model generator for generating a model of the acoustic environment of a scene in the moving picture sequence, the acoustic model including the location of elements in the scene that reflect sound or that cause sound to reverberate and the acoustic absorption characteristics of the elements; and
a processor for receiving the electrical signal, the model of the acoustic environment and an indication of the location of the participant in the scene for processing the electrical signal in accordance with the model of the acoustic environment of the scene and the position of the participant in the scene so as to generate an output electrical signal representative of the dialogue which would have been produced had the dubbing been performed in the scene and at the position of the participant in the scene.

21. The apparatus as claimed in claim 20, wherein said input comprises a replay device for replaying an electrical signal recorded on a recording medium.

22. The apparatus as claimed in claim 20, wherein said acoustic model generator comprises a computer having a graphical user interface by means of which a user can create and display a simulation of the scene by selecting and displaying predefined elements having predefined assignable acoustic properties, the computer being programmed to determine the acoustic environment of the scene by reference to the acoustic characteristics and the positions of the elements of the scene.

23. The apparatus as claimed in claim 22, wherein:
said graphical user interface allows the position in the scene of the participant whose dialogue is being dubbed to be entered and displayed together with associated times for a plurality of chronologically spaced apart times during the motion picture sequence; and
said processor receives from said graphical user interface indication of the positions of the participant during the motion picture sequence and simulates the dialogue which would have been produced by the participant based on the entered positions wherein, for times between which the positions of the participant are specified, said processor calculates intermediate positions in the scene for participant based on the positions of the participant for which time-specific positions in the scene are entered.

24. The apparatus as claimed in claim 22, wherein:
said graphical user interface enables the position of a simulated microphone in the scene be entered; and
said processor receives from said graphical user interface an indication of the position of the microphone in the scene and processes the electrical signal based on the model of the acoustic environment of the scene, the position of the participant in the scene and the position of the microphone in the scene.

25. The apparatus as claimed in claim 23, wherein:
said graphical user interface enables the position of a simulated microphone in the scene be entered; and
said processor receives from said graphical user interface an indication of the position of the microphone in the scene and processes the electrical signal based on the model of the acoustic environment of the scene, the position of the participant in the scene and the position of the microphone in the scene.

26. The apparatus as claimed in claim 20, wherein said processor comprises an acoustic processor having: a first input for receiving said electrical signal; a control input for receiving a signal representing the model of the acoustic characteristics of the scene; and an output from which the output electrical signal is output, wherein said acoustic processor is constructed and arranged to process the electrical signal as a function of the signal at the control input to produce the output electrical signal.

27. The apparatus as claimed in claim 20, further including a recording medium upon which the output electrical signal from said processor is recorded.

28. The method of claim 1, wherein said step of modifying the electrical signal includes the steps of:
performing a direct sound processing step, wherein the input electrical signal is processed to simulate sound produced by the participant and transmitted directly to a receiver;
performing a reflected sound processing step, wherein the input electrical signal is processed to simulate the sound produced by the participant and transmitted by reflective paths off objects in the scene and then to the receiver; and
combining the electrical signal produced as a result of said direct sound processing step and the electrical signal produced as a result of said reflected sound processing step to produce an output electrical signal representative of the dialogue which would have been heard based on the position of the participant.

29. The method of claim 1, wherein said step of modifying the electrical signal includes the steps of:
performing a direct sound processing step, wherein the input electrical signal is processed to simulate sound produced by the participant and transmitted directly to a receiver;
performing a reverberated sound processing step, wherein the input electrical signal is processed to simulate the sound produced as a result of the reverberations of objects in the scene produced as a consequence of the sound generated by the participant, the reverberated sound being transmitted to the receiver; and
combining the electrical signal produced as a result of said direct sound processing step and the electrical signal produced as a result of said reverberated sound processing step to produce an output electrical signal representative of the dialogue which would have been heard based on the position of the participant.

30. The apparatus of claim 12, wherein said processor includes:
a direct sound processing module configured to process the electrical signal to produce a direct sound electrical signal representative of sound produced by the participant and transmitted directly to a receiver; and
a reflected sound processing module configured to process the electrical signal to produce a reflected sound electrical signal representative of the sound produced by the participant and transmitted to the receiver by reflective paths off the elements in the scene; and
wherein said processor is configured to combine the direct sound signal and the reflected sound signal to produce the processed signal at said processor output.

31. The apparatus of claim 12, wherein said processor includes:
a direct sound processing module configured to process the electrical signal to produce a direct sound electrical signal representative of sound produced by the participant and transmitted directly to a receiver; and
a reverberated sound processing module configured to generate a reverberated sound signal representative of the reverberated sound that would be produced by reverberations of the elements in the scene as a result of the participant generating sound; and
wherein said processor is configured to combine the direct sound signal and the reverberated sound signal to produce the processed signal at said processor output.

32. The apparatus of claim 20, wherein said processor includes:
a direct sound processing module configured to process the electrical signal to produce a direct sound electrical signal representative of sound produced by the participant and transmitted directly to a receiver; and
a reflected sound processing module configured to process the electrical signal to produce a reflected sound electrical signal representative of the sound produced by the participant and transmitted to the receiver by reflective paths off the elements in the scene; and
wherein said processor is configured to combine the direct sound signal and the reflected sound signal to produce the output electrical signal.

33. The apparatus of claim 20, wherein said processor includes:
a direct sound processing module configured to process the electrical signal to produce a direct sound electrical signal representative of sound produced by the participant and transmitted directly to a receiver;

a reverberated sound processing module configured to generate a reverberated sound signal representative of the reverberated sound that would be produced by reverberations of the elements in the scene as a result of the participant generating sound; and wherein said processor is configured to combine the direct sound electrical signal and the reverberated sound electrical signal to produce the output electrical signal.

* * * * *